United States Patent
Hashimoto et al.

(10) Patent No.: US 9,386,468 B2
(45) Date of Patent: Jul. 5, 2016

(54) MOBILE COMMUNICATION TEST APPARATUS AND TEST METHOD

(71) Applicant: ANRITSU CORPORATION, Kanagawa (JP)

(72) Inventors: Reiichi Hashimoto, Kanagawa (JP); Hitoshi Nishizato, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 601 days.

(21) Appl. No.: 13/766,097

(22) Filed: Feb. 13, 2013

(65) Prior Publication Data

US 2013/0210371 A1 Aug. 15, 2013

(30) Foreign Application Priority Data

Feb. 14, 2012 (JP) ................................. 2012-029577

(51) Int. Cl.
*H04W 24/06* (2009.01)

(52) U.S. Cl.
CPC .................... *H04W 24/06* (2013.01)

(58) Field of Classification Search
USPC ...................................................... 455/67.14
See application file for complete search history.

(56) References Cited

U.S. PATENT DOCUMENTS

| 8,743,701 | B2* | 6/2014 | Tanaka | H04L 43/50 370/241 |
| 2004/0093135 | A1* | 5/2004 | Kang | H04B 17/16 455/67.11 |
| 2004/0266423 | A1* | 12/2004 | Morikawa | H04W 24/00 455/424 |
| 2012/0113813 | A1* | 5/2012 | Haverinen | H04L 12/2697 370/241 |

OTHER PUBLICATIONS

Miki, et al., "CA for Bandwidth Extension in LTE-Advanced", NTT DOCOMO Technical Journal, vol. 12, No. 2, Jul. 2010.

* cited by examiner

*Primary Examiner* — Charles C Jiang
*Assistant Examiner* — Kyaw Z Soe
(74) *Attorney, Agent, or Firm* — Pearne & Gordon LLP (57) ABSTRACT

There is provided a mobile communication test apparatus for performing an operation test of a mobile communication apparatus which performs wireless communication by bundling a plurality of frequency blocks. The apparatus includes: a logical channel distribution section 30 that performs a distribution process on logical channel data to be transmitted to a mobile communication apparatus, on a logical channel number basis, in accordance with preset distribution information; a plurality of communication processing sections 40 and 50, each of which is provided to correspond to each of the plurality of frequency blocks and receives the logical channel data which is distributed; and a data exchange section 60 that transmits the logical channel data from each communication processing section 40 or 50 to the communication processing section 40 or 50 to function as a transmission source of the corresponding data for the mobile communication apparatus.

10 Claims, 3 Drawing Sheets

FIG. 3 under distribution by the logical channel distribution section.

MOBILE COMMUNICATION TEST APPARATUS AND TEST METHOD

TECHNICAL FIELD

The present invention relates to a mobile communication test apparatus and a test method capable of performing an operation test of an LTE-Advanced or the like mobile communication apparatus (a terminal such as a base station or a mobile phone), which performs communication by bundling a plurality of frequency blocks, a chip mounted thereon, or the like.

BACKGROUND ART

Recently, in accordance with the widespread use of broadband in the mobile communication service, there is an ever increasing demand for high speed and high capacity. In this situation, LTE (Long Term Evolution), which is the next-generation mobile communication system as an alternative to the 3rd generation mobile communication system typified by W-CDMA (Wideband Code Division Multiple Access) and the 3.5th generation mobile communication system, is expected as a standard which leads to the 4th generation mobile communication system.

LTE is a communication standard which is standardized and prescribed by 3GPP (Third Generation Partnership Project), where a plurality of channel widths (1.4 MHz, 3 MHz, 5 MHz, 10 MHz, 15 MHz, or, 20 MHz) is defined by standards, OFDMA (Orthogonal Frequency Division Multiple Access) is used for the downlink, SC-FDMA (Single Carrier Frequency Division Multiple Access) is used for the uplink, and the communication speed of the peak data rate of 100 Mbps or more in the downlink and 50 Mbps or more in the uplink (in either case, the frequency bandwidth is 20 MHz) is a requirement.

Further, in order to further widen the bandwidth and increase communication speed, LTE-Advanced (hereinafter referred to as "LTE-A") using broadband including the system band, which is an allowable bandwidth for reception of LTE, is being standardized.

LTE-A is characterized in that, in order to be compatible with LTE and flexibly widen the bandwidth, by adopting two techniques of: a technique of upgrading MIMO (Multiple Input Multiple Output) of the spatial multiplexing technique; and a technique of widening the frequency bandwidth (Carrier Aggregation: CA) as a means of achieving wider bandwidth that bundles the frequency blocks (a channel bandwidth of maximum 20 MHz) for LTE called the component carrier (CC). Then, hybrid automatic repeat request (HARQ) or adaptive modulation channel encoding corresponding to radio wave environment is performed for each component carrier, and thus efficiency increases and transmission speed is improved (refer to Non-Patent Document 1 for further detail).

RELATED ART DOCUMENT

Patent Document

[Non-Patent Document 1] NTT DOCOMO Technical Journal Vol. 18 No. 2 Jul. 2010 12-21P [Japanese]
(English Cited Reference: NTT DOCOMO Technical Journal vol. 12 No. 2 10-19P, "Special Articles on LTE-Advanced Technology—Ongoing Evolution of LTE toward IMT-Advanced—CA for Bandwidth Extension in LTE-Advanced")

DISCLOSURE OF THE INVENTION

Problem that the Invention is to Solve

Meanwhile, for progress of research and development of LTE-A, in order to develop a mobile communication apparatus (a terminal such as a base station or a mobile phone) compliant with LTE-A, or a chip used therein, a mobile communication test apparatus is necessary that simulates an operation of a base station or a terminal which communicates as a counterparty with a development object. However, in LTE-A, the transmission speed is drastically increased compared with the existing communication standard. Hence, it is preferable to develop a mobile communication test apparatus having a high-level processing function complying with the communication standard.

Further, LTE-A is compatible with LTE. However, there are problems in that the mobile communication test apparatus complying with LTE-A cannot be realized by simply joining a plurality of LTE mobile communication test apparatuses, and considerable costs are involved in the development and manufacture of a mobile communication test apparatus compliant with LTE-A.

Accordingly, the present invention has been made in view of these problems, and its object is to provide a mobile communication test apparatus and a test method capable of an operation test of the mobile communication apparatus complying with the LTE-A at low cost.

Means for Solving the Problems

In order to achieve the above object, as described in claim 1 of the present invention, there is provided a mobile communication test apparatus 1 that simulates an operation of a counter device which communicates as a counterparty with a mobile communication apparatus performing wireless communication by bundling a plurality of frequency blocks.

The mobile communication test apparatus includes:
a logical channel distribution section 30 that performs a distribution process on logical channel data to be transmitted to the mobile communication apparatus, on a logical channel number basis, in accordance with preset distribution information;
a plurality of communication processing sections 40 and 50 each of which is provided to correspond to each of the plurality of frequency blocks and receives the logical channel data which is distributed by the logical channel distribution section; and
a data exchange section 60 that transmits the logical channel data from each communication processing section to the communication processing section which is to function as a transmission source of the corresponding data for the mobile communication apparatus.

Each communication processing section is provided with a MAC processing portion (43, 53) having a data retaining portion (43a, 53a) which temporarily retains the logical channel data distributed by the logical channel distribution section, if the logical channel data is addressed to the communication processing section itself, converts the logical channel data into transport channel data, otherwise sends the logical channel data to the data exchange section.

As described in claim 2, the mobile communication test apparatus according to claim 1 further includes a scheduler 43b that performs scheduling for allocating the communication processing section to function as the transmission source of the corresponding logical channel data, on the basis of property information of each logical channel data which is output from each communication processing section 40 or 50, and outputs a scheduling result thereof as scheduling result information to each communication processing section.

The communication processing section sends the logical channel data, which is not self-addressed, in the retained logical channel data to the corresponding communication processing section through the data exchange section 60, on the basis of the scheduling result information from the scheduler.

As described in claim 3, in the mobile communication test apparatus according to claim 1, the logical channel distribution section 30 performs the distribution process in accordance with distribution information described in a scenario in which messages are chronologically described in a sequence of an operation test of the mobile communication apparatus.

As described in claim 4, there is provided a mobile communication test apparatus 1 that simulates an operation of a counter device which communicates as a counterparty with a mobile communication apparatus performing wireless communication by bundling a plurality of frequency blocks.

The mobile communication test apparatus includes:

a plurality of communication processing sections 40 and 50 each of which is provided to correspond to each of the plurality of frequency blocks, is provided with a MAC processing portion 43 or 53 having a data retaining portion 43a or 53a which temporarily retains the logical channel data divided by analyzing a MAC header of transport channel data into which a signal of a predetermined number of the frequency block transmitted from the mobile communication apparatus is converted, processes the logical channel data, which is self-addressed, on a logical channel basis, and sends the logical channel data, which is not self-addressed, to the outside; and a data exchange section 60 that receives the logical channel data, which is sent to the outside by each communication processing section, and transmits the corresponding logical channel data to the communication processing section as a transmission destination.

As described in claim 5, in the mobile communication test apparatus according to claim 4, the MAC processing portion 43 or 53 performs a distribution process of distributing the logical channel data to the logical channel data, which is self-addressed, and the logical channel data, which is not self-addressed, in accordance with distribution information described in a scenario in which messages are chronologically described in a sequence of an operation test of the mobile communication apparatus.

As described in claim 6, there is provided a mobile communication test method that uses a mobile communication test apparatus 1 including a plurality of communication processing sections 40 and 50, each of which is provided to correspond to each of the plurality of frequency blocks in order to communicate with a mobile communication apparatus by bundling a plurality of frequency blocks, and a data exchange section 60, which performs a relay process of data exchanged between the communication processing sections, and that simulates an operation of a counter device which communicates as a counterparty with the mobile communication apparatus.

The mobile communication test method includes steps of:

distributing logical channel data, to be transmitted to the mobile communication apparatus, to each communication processing section in accordance with preset distribution information;

sending the logical channel data, which is not addressed to the corresponding communication processing section, in the logical channel data, which is distributed to the communication processing section, to the communication processing section to function as a transmission source of the corresponding data, through the data exchange section; and converting the logical channel data, which is received through the data exchange section, and the logical channel data, which is distributed to be addressed to the corresponding communication processing section, in the logical channel data, which is distributed to the communication processing sections, into transport channel data.

As described in claim 7, the mobile communication test method according to claim 6 further includes steps of:

performing scheduling for allocating the communication processing section to function as the transmission source of the corresponding logical channel data, on the basis of property information of each logical channel data which is output from each communication processing section 40 or 50;

outputting a scheduling result of the scheduling as scheduling result information to each communication processing section; and sending the logical channel data, which is not self-addressed, in the logical channel data, which is retained by the communication processing section, to the corresponding communication processing section through the data exchange section 60, on the basis of the scheduling result information.

As described in claim 8, in the mobile communication test method according to claim 6, in the step of distributing, distribution is performed in accordance with distribution information described in a scenario in which messages are chronologically described in a sequence of an operation test of the mobile communication apparatus.

As described in claim 9, there is provided a mobile communication test method that uses a mobile communication test apparatus 1 including a plurality of communication processing sections 40 and 50, each of which is provided to correspond to each of the plurality of frequency blocks in order to communicate with a mobile communication apparatus by bundling a plurality of frequency blocks, and a data exchange section 60, which performs a relay process of data exchanged between the communication processing sections, and that simulates an operation of a counter device which communicates as a counterparty with the mobile communication apparatus.

The mobile communication test method includes steps of:

performing a division process such that a MAC header of transport channel data, into which a signal of a predetermined number of the frequency block transmitted from the mobile communication apparatus is converted, is analyzed to be logical channel data;

distributing the corresponding logical channel data to the communication processing section to process the logical channel data in accordance with preset distribution information;

sending the logical channel data, which is not addressed to the corresponding communication processing section, in the logical channel data, which is distributed to the communication processing section, to the communication processing section as a transmission destination of the corresponding data, through the data exchange section; and processing the logical channel data, which is received through the data exchange section, and the logical channel data, which is distributed to be addressed to the corresponding communication processing section, in the logical channel data, which is distributed to the communication processing sections, on a logical channel basis.

As described in claim 10, in the mobile communication test method according to claim 9, in the step of distributing, the logical channel data is distributed in accordance with distribution information described in a scenario in which messages are chronologically described in a sequence of an operation test of the mobile communication apparatus.

Advantage of the Invention

According to the mobile communication test apparatus of the present invention, in order to perform a transmission process, the following configuration is adopted: logical channel data to be transmitted to the mobile communication apparatus is processed to be distributed to the plurality of communication processing section, on a logical channel number basis, in accordance with preset distribution information; and in the communication processing section, the logical channel data, which is not self-addressed, in the logical channel data which is temporarily retained, is sent to the communication processing section to function as a transmission source of the corresponding data through the data exchange section. Hence, it is possible to provide, with low costs, the mobile communication test apparatus capable of performing various operation tests of the LTE-A mobile communication apparatus or the like which performs wireless communication by bundling a predetermined number of frequency blocks.

Further, in order to perform a reception process, the following configuration is adopted: the communication processing apparatus distributes the logical channel data, which is received from the mobile communication apparatus, in accordance with the preset distribution information, and sends the logical channel data, which is distributed not to be self-addressed, to the communication processing section to function as a transmission destination of the corresponding data through the data exchange section. Hence, it is possible to provide, with low costs, the mobile communication test apparatus capable of performing various operation tests of the LTE-A mobile communication apparatus or the like which performs wireless communication by bundling a predetermined number of frequency blocks.

BEST MODE FOR CARRYING OUT THE INVENTION

Hereinafter, an embodiment for carrying out the present invention will be described with reference to the accompanying drawings. It should be noted that the invention is not limited by the embodiment, but all other embodiments, which can be carried out by those skilled in the art and the like on the basis of the embodiment, such as examples and operation techniques are included in the scope of the present invention.

A mobile communication test apparatus according to the present invention has an object of achieving the wider bandwidth and higher speed in LTE. The apparatus is a test apparatus that operates as a counter device (a base station simulation apparatus for a communication terminal or a communication terminal simulation apparatus for a base station) in order to develop mobile communication apparatuses (a communication terminal (user equipment: UE), a base station, and a chip used therein) compliant with LTE-Advanced (hereinafter referred to as "LTE-A") employing a technique of performing wireless communication by bundling a plurality of frequency blocks.

In addition, in the following description, a description will be given of, as an example, a test apparatus that tests a mobile communication terminal by simulating the base station. Further, the contents of the test process of the apparatus are broadly divided into a downlink process (transmission process) and an uplink process (reception process) between the apparatus and various mobile communication apparatuses, and these processes are described separately below.

[1. Downlink Process]
<1-1. Apparatus Configuration>

First, the downlink process of the mobile communication test apparatus of the present example will be described.

Figure 1:
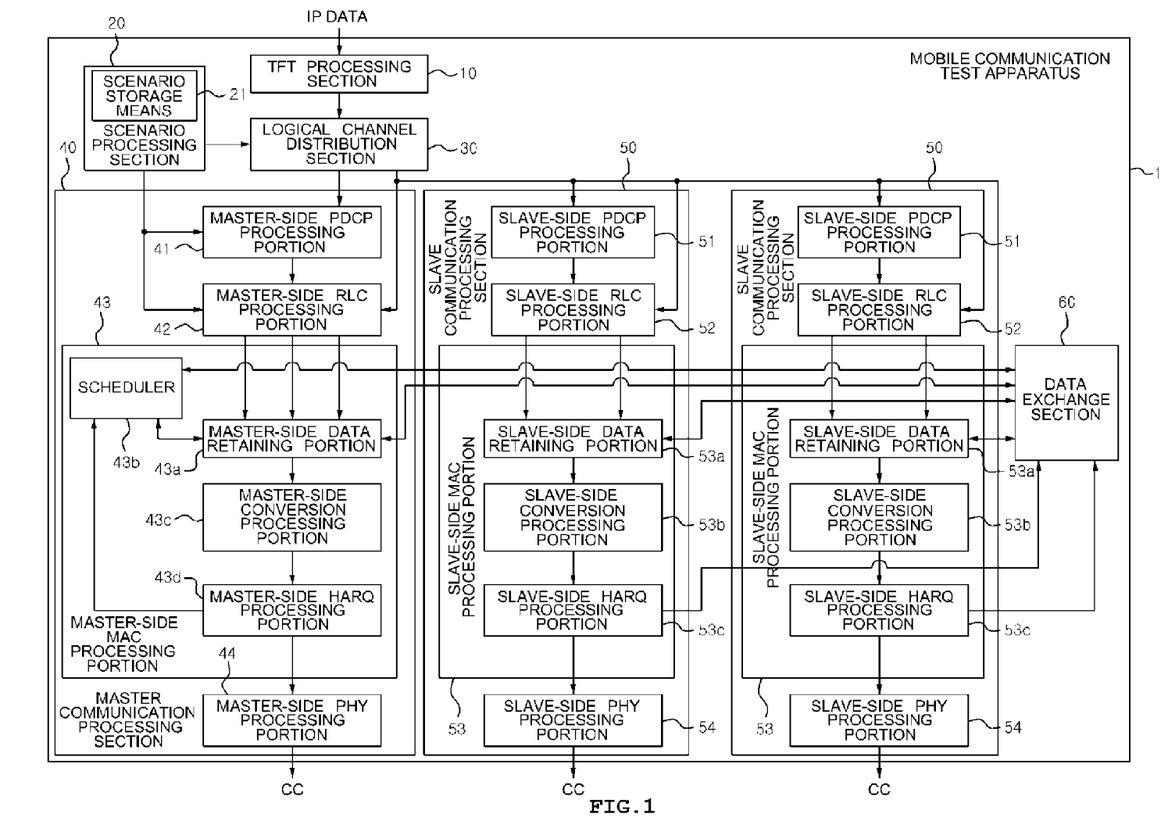
FIG. 1 is a functional block diagram for achieving a downlink process in a mobile communication test apparatus according to the present invention.

FIG. 1 shows functions for achieving the downlink process of the mobile communication test apparatus 1 of the present example. The apparatus includes a TFT processing section 10, a scenario processing section 20, a logical channel distribution section 30, a master communication processing section 40, a slave communication processing section 50, and a data exchange section 60.

In addition, the drawing shows an exemplary configuration in which the data exchange section 60 relays transmission and reception of data between one master communication processing section 40 and two slave communication processing sections 50. However, in a case of a configuration in which a plurality of slave communication processing sections 50 are connected to the master communication processing section 40, the number of connections of the slave communication processing sections 50 is not particularly limited.

(TFT Processing Section)

The TFT processing section 10 maps IP data, which is externally input (regardless of wired/wireless) or is stored therein in advance, through traffic flow template (hereinafter simply referred to as "TFT") packet filtering at an appropriate logical channel (DTCH (Dedicated Traffic Channel), MTCH (Multicast Traffic Channel)), and outputs the data to the logical channel distribution section 30.

It should be noted that examples of items used in the TFT packet filtering include an IP address, a subnet mask thereof, a protocol number (IPv4)/next header (IPv6), a port number, an IPSecSPI value, and the like.

(Scenario Processing Section)

The scenario processing section 20 has a scenario storage means 21 which stores a scenario in which messages are chronologically described in a sequence of a predetermined operation test complying with LTE-A, and outputs a layer 3 message, which is issued when the scenario corresponding to the operation test is sequentially read and executed, to a master communication processing section 40 as control data (MCCH (Multicast Control Channel) data, DCCH (Dedicated Control Channel) data), CCCH (Common Control Channel) data, BCCH (Broadcast Control Channel) data, and PCCH (Paging Control Channel) data.

Figure 2:
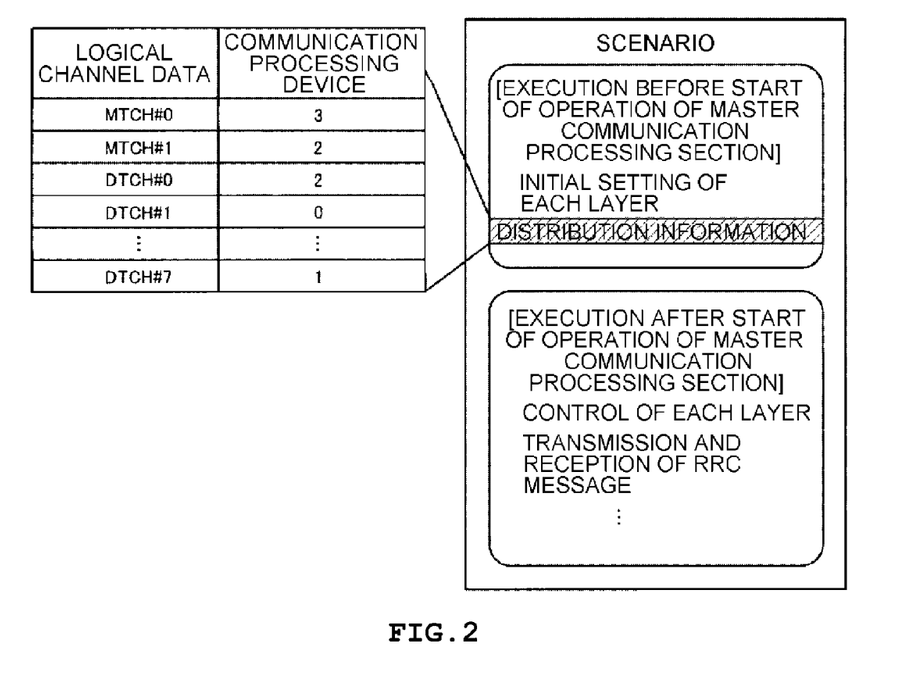
FIG. 2 is an explanatory diagram conceptually illustrating distribution information described in a scenario.

Further, since distribution information which is information on instructions to distribute the mapped logical channels is described in the scenario, the scenario processing section 20 outputs the distribution information to the logical channel distribution section 30. The distribution information arbitrarily matches the types and the numbers of logical channels and the numbers of the master communication processing section 40 and the slave communication processing sections 50 as distribution destinations. It should be noted that FIG. 2 shows distribution information represented as a conceptual table. In this example, identifiable numbers are respectively assigned to the master and slave communication processing sections 40 and 50, and pieces of the logical channel data and the distribution information, in which the distribution destinations are designated in advance, are described in a scenario which is executed before operation start of the master communication processing section 40 in the scenario.

(Logical Channel Distribution Section)

The logical channel distribution section 30 performs a process of distributing the logical channel data, which is mapped by the TFT processing section 10, to the master communication processing section 40 or the slave communication processing sections 50 on a basis of corresponding logical channel (DTCH, MTCH) numbers in accordance with the distribution information sent from the scenario processing section 20. It should be noted that, in the logical channel data which is distributed by the logical channel distribution section 30, the DTCH data is output to each of a master-side PDCP processing portion 41 and slave-side PDCP processing portions 51 to be described later, and the MTCH data is output to each of a master-side RLC processing portion 42 and slave-side RLC processing portions 52 to be described later.

(Master Communication Processing Section)

The master communication processing section 40 includes: the master-side PDCP processing portion 41 that processes a PDCP (Packet Data Convergence Protocol) sub of a layer 2; the master-side RLC processing portion 42 that processes an RLC (Radio Link Control) sublayer of the layer 2; a master-side MAC processing portion 43 that processes a MAC (Medium Access Control) sublayer of the layer 2; and a master-side PHY (physical) processing portion 44 that processes a layer 1.

The master-side PDCP processing portion 41 executes a ciphering process and a header compression process, which is based on ROHC (Robust Header Compression) for each logical channel, on each logical channel data (DTCH data), which is sent from the logical channel distribution section 30, and gives an output thereof to the master-side RLC processing portion 42. Further, the processing portion receives the logical channel data (DCCH data) from the scenario processing section 20, executes an integrity protection process and a ciphering process thereon, and gives an output thereof to the master-side RLC processing portion 42.

The master-side RLC processing portion 42 executes segmentation and concatenation processes and an ARQ (Automatic repeat request) process (retransmission process) on the logical channel data (DTCH data, DCCH data) which is sent from the master-side PDCP processing portion 41, the logical channel data (MTCH data) which is sent from the logical channel distribution section 30, and the logical channel data (MCCH data) which is sent from the scenario processing section 20, for each logical channel, and gives an output thereof to the master-side MAC processing portion 43. Further, the master-side RLC processing portion 42 receives the logical channel data (BCCH data, CCCH data, PCCH data), which is control data, from the scenario processing section 20, and outputs the data to the master-side MAC processing portion 43.

The master-side MAC processing portion 43 includes a master-side data retaining portion 43*a*, a scheduler 43*b*, a master-side conversion processing portion 43*c*, and a master-side HARQ (Hybrid Automatic repeat request) processing portion 43*d*. The master-side MAC processing portion 43 performs scheduling of each logical channel data which is sent from the master-side RLC processing portion 42, converts the logical channel data into transport channel data, thereafter performs an HARQ process thereon, and gives an output thereof to the master-side PHY processing portion 44 of the lower layer.

The master-side data retaining portion 43*a* is a storage buffer that temporarily retains the logical channel data (MTCH data, MCCH data, DTCH data, DCCH data, BCCH data, CCCH data, PCCH data) sent from the master-side RLC processing portion 42. The master-side data retaining portion 43*a* outputs property information of the input logical channel data (including, for example, the data is channel type information, channel number information, channel RLC sequence number information, size information of logical channel data, or information as to whether or not retransmission data from the master-side RLC processing portion 42) to the scheduler 43*b*, and gives the output thereof to the corresponding slave-side data retaining portion 53*a* through the data exchange section 60 when the retained logical channel data is data which is not self-addressed, on the basis of scheduling result information of the logical channel data which is input as a response thereof from the scheduler 43*b*.

Further, the master-side data retaining portion 43*a* outputs the property information, which is input from the slave-side data retaining portions 53*a* through the data exchange section 60, to the scheduler 43*b*, and outputs the scheduling result information, which is input from the scheduler 43*b*, for the slave-side data retaining portions 53*a* to the slave-side data retaining portions 53*a* through the data exchange section 60.

It should be noted that, when the logical channel data retained in accordance with the scheduling result information is data which is self-addressed, the master-side data retaining portion 43*a* outputs the retained logical channel data to the master-side conversion processing portion 43*c* as it is.

When there are inputs of: the property information of each logical channel data which is retained by the master-side data retaining portion 43*a* and the slave-side data retaining portions 53*a*; and the transmission determination information which is periodically input from the master-side HARQ processing portion 43*d* and the slave-side HARQ processing portions 53*c* (information which represents a data transmission ability additionally in consideration of a situation of retransmission to the master-side PHY processing portion 44 and the slave-side PHY processing portions 54 to be described later through the HARQ process), the scheduler 43*b* performs scheduling of each logical channel data, which is retained in each of the master-side data retaining portion 43*a* and the slave-side data retaining portions 53*a*, on the basis of such information, and outputs the scheduling result as the scheduling result information to the master-side data retaining portion 43*a*.

It should be noted that scheduling is a process (so-called scheduling/priority handling process) of allocating each logical channel data to any one of the communication processing sections, which are transmission destinations, in consideration of the above-mentioned property information, the transmission determination information, or the like.

The master-side conversion processing portion 43*c* is provided for each corresponding CC, combines the logical channel data which is sent from the master-side data retaining portion 43*a*, converts the data into the transport channel data to which the header representing the combination result is further added, and gives an output thereof to the master-side HARQ processing portion 43*d*.

The master-side HARQ processing portion 43*d* is provided for each corresponding CC, performs the HARQ process, in which the ARQ process and the FEC (Forward Error Correction) process are combined, on the transport channel data which is sent from the master-side conversion processing portion 43*c*, and gives an output thereof to the master-side PHY processing portion 44. Further, the master-side HARQ processing portion 43*d* outputs the transmission determination information, which is based on a situation of transmission of the transport channel data to the master-side PHY processing portion 44, to the scheduler 43b at stated periods (for example, a period of 1 mS synchronous to the timing of outputting the transport channel data from the master-side HARQ processing portion 43d to the master-side PHY processing portion 44).

The master-side PHY processing portion 44 is provided for each corresponding CC, and performs the so-called layer 1 process of mapping the transport channel data sent from the master-side HARQ processing portion 43d in physical channels, converting the data into an RF output signal of the CC, and outputting the signal.

(Slave Communication Processing Section)

The slave communication processing section 50 includes: the slave-side PDCP processing portion 51 that processes the PDCP sublayer of the layer 2; the slave-side RLC processing portion 52 that processes the RLC sublayer of the layer 2; a slave-side MAC processing portion 53 that processes the MAC sublayer of the layer 2; and a slave-side PHY processing portion 54 that processes the layer 1.

The slave-side PDCP processing portion 51 executes a ciphering process and a header compression process, which is based on ROHC for each logical channel, on the logical channel data (DTCH data), which is sent from the logical channel distribution section 30 as an upper layer, and gives an output thereof to the slave-side RLC processing portion 52.

The slave-side RLC processing portion 52 outputs each logical channel data, which is obtained by executing segmentation and concatenation processes and an ARQ process (re-transmission process) on the logical channel data (DTCH data) sent from the slave-side PDCP processing portion 51 and the logical channel data (MTCH data) sent from the logical channel distribution section 30 for each logical channel, to the slave-side MAC processing portion 53.

The slave-side MAC processing portion 53 includes a slave-side data retaining portion 53a, a slave-side conversion processing portion 53b, and a slave-side HARQ processing portion 53c. The slave-side MAC processing portion 53 performs scheduling/priority handling process on the logical channel data which is sent from the slave-side RLC processing portion 52, converts the logical channel data into transport channel data, thereafter performs the HARQ process thereon, and gives an output thereof to the slave-side PHY processing portion 54 of the lower layer.

The slave-side data retaining portion 53a is a storage buffer that temporarily retains the logical channel data sent from the slave-side RLC processing portion 52. The slave-side data retaining portion 53a outputs the property information of the input logical channel data to the scheduler 43b through the data exchange section 60. Further, the slave-side data retaining portion 53a sends the retained logical channel data to the master-side data retaining portion 43a or the corresponding slave-side data retaining portion 53a through the data exchange section 60 when the retained logical channel data is data which is not self-addressed, on the basis of scheduling result information of the logical channel data which is input as a response from the scheduler 43b through the data exchange section 60.

Further, the slave-side data retaining portion 53a inputs the scheduling result information, which is sent from the scheduler 43b, through the data exchange section 60.

It should be noted that, when the logical channel data retained in accordance with the scheduling result information is data which is self-addressed, the slave-side data retaining portion 53a outputs the retained logical channel data to the slave-side conversion processing portion 53b as it is.

The slave-side conversion processing portion 53b is provided for each corresponding CC, combines the logical channel data which is sent from the slave-side data retaining portion 53a, converts the data into the transport channel data to which the header representing the combination result is further added, and gives an output thereof to the slave-side HARQ processing portion 53c.

The slave-side HARQ processing portion 53c is provided for each corresponding CC, performs the HARQ process, in which the ARQ process and the FEC process are combined, on the transport channel data which is sent from the slave-side conversion processing portion 53b, and gives an output thereof to the slave-side PHY processing portion 54. Further, the slave-side HARQ processing portion 53c outputs the transmission determination information, which is based on a situation of transmission of the transport channel data to the slave-side PHY processing portion 54, to the scheduler 43b through the data exchange section 60 at stated periods (for example, a period of 1 mS the same as that of the master-side HARQ processing portion 43d).

The slave-side PHY processing portion 54 is provided for each corresponding CC, and performs the so-called layer 1 process of mapping the transport channel data sent from the slave-side HARQ processing portion 53c in physical channels, converting the data into an RF output signal of the CC, and outputting the signal.

(Data Exchange Section)

The data exchange section 60 performs a process of relaying various kinds of information and the logical channel data transmitted and received between the master-side data retaining portion 43a and each slave-side data retaining portion 53a. The detailed processes are as follows. When inputting the property information of the logical channel data retained by each slave-side data retaining portion 53a, the data exchange section 60 performs a process of outputting the information to the master-side data retaining portion 43a. Further, when inputting the scheduling result information which is sent from the master-side data retaining portion 43a, the data exchange section 60 performs a process of outputting the information to the corresponding slave-side data retaining portion 53a. Furthermore, the data exchange section 60 performs a process of transmitting the logical channel data, which is sent from the master-side data retaining portion 43a or each slave-side data retaining portion 53a, to the corresponding master-side data retaining portion 43a or the slave-side data retaining portion 53a. Further, the data exchange section 60 performs a process of outputting the transmission determination information, which is sent from each slave-side HARQ processing portion 53c, to the scheduler 43b.

<1-2. Processing Operation>

Next, a sequence of processing operations in a downlink process of the above-mentioned mobile communication test apparatus will be described. Here, a description will be given of a processing operation example in a case where the downlink process for externally input IP data is executed in accordance with the preset scenario, and it is assumed that the output of the distribution information and the initial setting of each layer is completed in accordance with the scenario stored in the scenario storage means 21.

First, the layer 3 message is output as control data (DCCH data, MCCH data, CCCH data, BCCH data and PCCH data) to the master communication processing section 40 in accordance with the scenario. Then, the logical channel data (DTCH data, MTCH data), in which the externally input IP data is mapped to the logical channels (DTCH, MTCH) by the TFT processing section 10, is output to the logical channel distribution section 30.

The logical channel distribution section 30 performs the process of distributing the logical channel data, which is mapped by the TFT processing section 10, to the master communication processing section 40 or the slave communication processing sections 50 on a basis of corresponding logical channel (DTCH, MTCH) numbers in accordance with the distribution instruction sent from the scenario processing section 20.

Next, in the logical channel data which is processed to be distributed to the master communication processing section 40, the logical channel data (DTCH data) is firstly subjected to the header compression process and the ciphering process based on ROHC for each logical channel in the master-side PDCP processing portion 41, and it output to the master-side RLC processing portion 42. Further, the logical channel data (DCCH data) sent from the scenario processing section 20 is subjected to the integrity protection process and the ciphering process in the master-side PDCP processing portion 41, and is output to the master-side RLC processing portion 42. Next, the master-side RLC processing portion 42 executes the segmentation and concatenation processes and the ARQ process on the logical channel data (DTCH data, DCCH data, MTCH data, MCCH data) which is sent from the master-side PDCP processing portion 41, the logical channel distribution section 30, and the scenario processing section 20, for each logical channel, and gives an output thereof to the master-side MAC processing portion 43. Further, the master-side RLC processing portion 42 receives the logical channel data (BCCH data, CCCH data, PCCH data), which is control data, from the scenario processing section 20, and outputs the data to the master-side MAC processing portion 43.

In the master-side MAC processing portion 43, first the logical channel data sent from the master-side RLC processing portion 42 is temporarily stored in the master-side data retaining portion 43a. Then, the property information of the input logical channel data is output to the scheduler 43b. On the basis of the scheduling result information which can be obtained as the response thereof through the scheduling/priority handling process by the scheduler 43b, when the retained logical channel data is data which is not self-addressed, the data is sent to the corresponding slave-side data retaining portion 53a through the data exchange section 60. Further, when the retained logical channel data is data which is self-addressed, the retained logical channel data is output to the master-side conversion processing portion 43c as it is.

The logical channel data sent from the master-side data retaining portion 43a is converted into the transport channel data to which the combination process is executed and the header representing the combination result is added in the master-side conversion processing portion 43c. Then, after the HARQ process is performed on the transport channel data in the master-side HARQ processing portion 43d, the transport channel data is mapped to the physical channels in the master-side PHY processing portion 44, is converted into the RF output signal of the CC, and gives an output thereof.

On the other hand, the same processes for the layer 2 and the layer 1 in the master communication processing section 40 and the slave communication processing sections 50 are performed in parallel.

First, in the slave-side PDCP processing portions 51, the header compression process based on ROHC and the ciphering process are performed on the logical channel data (DTCH data) which is sent from the logical channel distribution section 30. In the slave-side RLC processing portions 52, each logical channel data, in which the segmentation and concatenation process and the ARQ process are performed for each logical channel on the logical channel data (DTCH data, MTCH data) sent from the slave-side PDCP processing portions 51 and the logical channel distribution section 30, is output to the slave-side MAC processing portion 53.

In the slave-side MAC processing portion 53, the logical channel data sent from the slave-side RLC processing portions 52 is temporarily stored in the slave-side data retaining portion 53a. Then, the property information of the input logical channel data is output to the scheduler 43b through the data exchange section 60. On the basis of the scheduling result information which is input as the response thereof from the scheduler 43b through the data exchange section 60, when the retained logical channel data is data which is not self-addressed, the retained logical channel data is sent to the master-side data retaining portion 43a or the corresponding slave-side data retaining portion 53a through the data exchange section 60. Further, when the retained logical channel data is data which is self-addressed, the retained logical channel data is output to the slave-side conversion processing portion 53b as it is.

The logical channel data sent from the slave-side data retaining portion 53a is converted into the transport channel data to which the combination process is executed and the header representing the combination result is added in the slave-side conversion processing portion 53b. Then, after the HARQ process is performed on the transport channel data in the slave-side HARQ processing portion 53c, the transport channel data is mapped to the physical channels in the slave-side PHY processing portion 54, is converted into the RF output signal of the CC, and gives an output thereof.

[2. Uplink Process]

Next, the uplink process of the mobile communication test apparatus according to the present invention will be described.

It should be noted that, in the following description, components the same as the components which are described in the above-mentioned downlink process are represented by the same reference numerals and signs, and are used in processing contents. Accordingly, only the processing contents for the uplink process will be described.

<2-1. Apparatus Configuration>

Figure 3:
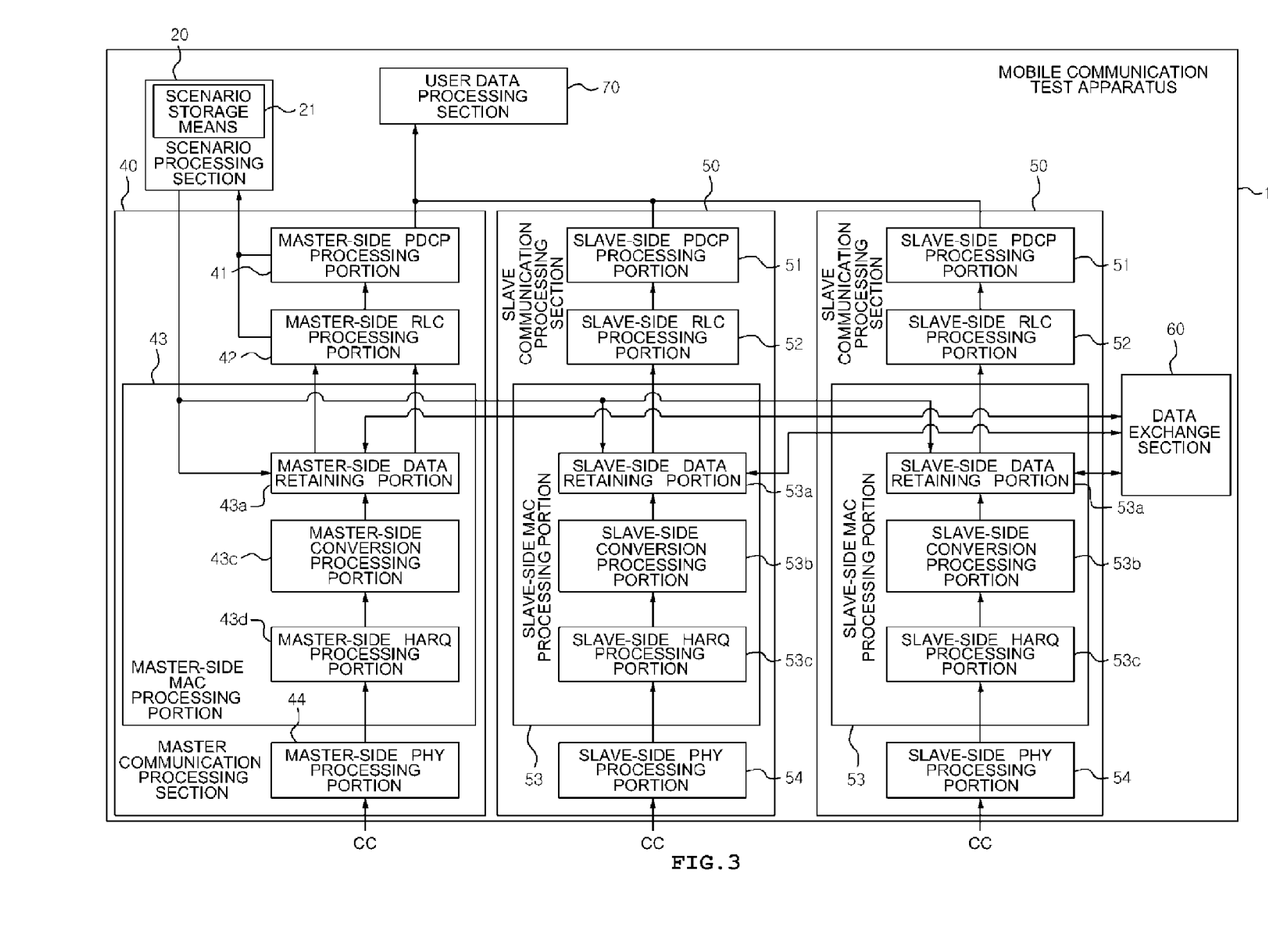
FIG. 3 is a functional block diagram for achieving an uplink process in the same apparatus.

FIG. 3 shows functions for achieving the uplink process of the mobile communication test apparatus 1 of the present example. The apparatus includes a user data processing section 70, the scenario processing section 20, the master communication processing section 40, the slave communication processing sections 50, and the data exchange section 60.

In addition, in a similar manner to the system configuration at the time of the downlink process, the drawing shows an exemplary configuration in which the data exchange section 60 relays transmission and reception of data between one master communication processing section and two slave communication processing sections 50. However, in a case of a configuration in which a plurality of slave communication processing sections 50 are connected to the master communication processing section 40, the number of connections of the slave communication processing sections 50 is not particularly limited.

(User Data Processing Section)

The user data processing section 70 performs a data analysis process corresponding to test contents, such as a process of comparing data and a process of detecting the error rate of the IP data obtained from the master communication processing section 40 and the slave communication processing sections 50, and a data output process for a connected external apparatus (for example, a voice server).

(Scenario Processing Section)

The scenario processing section 20 has a scenario storage means 21 which stores a scenario in which messages are chronologically described in a sequence of a predetermined operation test complying with LTE-A, and outputs the distribution information, which is for performing a process of distributing the logical channel data subjected to the conversion/division process (demultiplex) based on the MAC header of the logical channel data converted by the data conversion processing portion, to the master-side MAC processing portion 43 and the slave-side MAC processing portions 53. It should be noted that the distribution information is the same as the distribution information in the downlink process mentioned above, and the types and the numbers of logical channels and the numbers corresponding to the master communication processing section 40 and the slave communication processing sections 50 as the distribution destinations are set in advance, such that the types and the numbers of logical channels correspond to the numbers of the distribution destinations.

Further, the scenario processing section 20 inputs the control data (CCCH data, DCCH data), which is output from the master communication processing section 40, as a protocol message of the RRC sublayer of the layer 3.

(Master Communication Processing Section)

The master communication processing section 40 includes: the master-side PDCP processing portion 41 that processes a PDCP sublayer of the layer 2; the master-side RLC processing portion 42 that processes an RLC sublayer of the layer 2; the master-side MAC processing portion 43 that processes the MAC sublayer of the layer 2; and the master-side PHY processing portion 44 that processes the layer 1.

The master-side PDCP processing portion 41 executes a decompression process based on ROHC and a deciphering process on the logical channel data (DTCH data) which is sent from the master-side RLC processing portion 42. Further, the master-side PDCP processing portion 41 executes a deciphering process and an integrity verification process on the control data (DCCH data) which is sent from the master-side RLC processing portion 42. Then, the master-side PDCP processing portion 41 outputs the processed DTCH data as the IP data to the user data processing section 70, and outputs the processed DTCH data as the protocol message of the RRC sublayer of the layer 3 to the scenario processing section 20.

The master-side RLC processing portion 42 executes the segmentation and concatenation processes and the ARQ process on the logical channel data (DTCH data, DCCH data), which is sent from the master-side MAC processing portion 43, for each logical channel, and gives an output thereof to the master-side PDCP processing portion 41. Further, the master-side RLC processing portion 42 outputs the control data (CCCH data), which is sent from the master-side data retaining portion 43a, as the protocol message of the RRC sublayer of the layer 3 to the scenario processing section 20.

The master-side MAC processing portion 43 includes the master-side data retaining portion 43a, the master-side conversion processing portion 43c, and the master-side HARQ processing portion 43d, and performs the process of converting/dividing (demultiplexing) the transport channel data, which is sent from the master-side PHY processing portion 44, into the logical channel data, and gives an output thereof to the master-side RLC processing portion 42.

The master-side data retaining portion 43a is a storage buffer that temporarily retains the logical channel data which is input from the slave communication processing sections 50 through the data exchange section 60 and the master-side conversion processing portion 43c. The master-side data retaining portion 43a performs cross-checking between the property information of the input logical channel data (for example, channel type information, channel number information) and the distribution information which is sent from the scenario processing section 20, and sends the retained logical channel data to the corresponding slave-side data retaining portion 53a through the data exchange section 60 when the retained logical channel data is data which is not self-addressed.

It should be noted that the master-side data retaining portion 43a outputs the retained logical channel data to the master-side RLC processing portion 42 as it is, when the retained logical channel data is data which is self-addressed, on the basis of the distribution information.

The master-side conversion processing portion 43c is provided for each corresponding CC, analyzes the MAC header of the transport channel data which is sent from the master-side HARQ processing portion 43d, and performs the division process thereon such that it is changed into the logical channel data (DTCH data, DCCH data, CCCH data), thereby giving the output thereof to the master-side data retaining portion 43a.

The master-side HARQ processing portion 43d is provided for each corresponding CC, performs the HARQ process on the transport channel data which is sent from the master-side PHY processing portion 44, and thereafter gives an output thereof to the master-side conversion processing portion 43c.

The master-side PHY processing portion 44 is provided for each corresponding CC, converts the physical channel data, which can be obtained by demodulating the RF signal from the mobile communication apparatus, into the transport channel data, and thereafter gives an output thereof to the master-side HARQ processing portion 43d.

(Slave Communication Processing Section)

The slave communication processing section 50 includes: the slave-side PDCP processing portion 51 that processes the PDCP sublayer of the layer 2; the slave-side RLC processing portion 52 that processes the RLC sublayer of the layer 2; the slave-side MAC processing portion 53 that processes the MAC sublayer of the layer 2; and the slave-side PHY processing portion 54 that processes the layer 1.

The slave-side PDCP processing portion 51 executes the integrity verification process and the decompression process based on ROHC on the logical channel data (DTCH data) which is sent from the slave-side RLC processing portion 52. Then, the slave-side PDCP processing portion 51 outputs the processed DTCH data as the IP data to the user data processing section 70.

The slave-side RLC processing portion 52 performs the ARQ process and the segmentation and concatenation process on the logical channel data (DTCH data) which is sent from the slave-side MAC processing portion 53, and gives an output thereof to the slave-side PDCP processing portions 51.

The slave-side MAC processing portion 53 includes the slave-side data retaining portion 53a, the slave-side conversion processing portion 53b, and the slave-side HARQ processing portion 53c, and performs the process of converting/dividing (demultiplexing) the transport channel data, which is sent from the slave-side PHY processing portion 54, into the logical channel data, and gives an output thereof to the slave-side RLC processing portion 52.

The slave-side data retaining portion 53a is a storage buffer that temporarily retains the logical channel data input from the master communication processing section 40 and the slave communication processing sections 50, which is not self-addressed, through the data exchange section 60 and the slave-side conversion processing portion 53b. The slave-side data retaining portion 53a performs cross-checking between the property information of the input logical channel data and the distribution information which is sent from the scenario processing section 20, and sends the retained logical channel data to the master-side data retaining portion 43a or the corresponding slave-side data retaining portion 53a through the data exchange section 60 when the retained logical channel data is data which is not self-addressed.

It should be noted that the slave-side data retaining portion 53a outputs the retained logical channel data to the slave-side RLC processing portion 52 as it is, when the retained logical channel data is data which is self-addressed, on the basis of the distribution information.

The slave-side conversion processing portion 53b is provided for each corresponding CC, analyzes the MAC header of the transport channel data which is sent from the master-side HARQ processing portion 43d, and performs the division process thereon such that it is changed into the logical channel data (DTCH data, DCCH data, CCCH data), thereby giving the output thereof to the slave-side data retaining portion 53a.

The slave-side HARQ processing portion 53c is provided for each corresponding CC, performs the HARQ process on the transport channel data which is sent from the slave-side PHY processing portion 54, and thereafter gives an output thereof to the slave-side conversion processing portion 53b.

The slave-side PHY processing portion 54 is provided for each corresponding CC, converts the physical channel data, which can be obtained by demodulating the RF signal from the mobile communication apparatus, into the transport channel data, and thereafter gives an output thereof to the slave-side HARQ processing portion 53c.

(Data Exchange Section)

The data exchange section 60 performs a process of relaying the logical channel data transmitted and received between the master-side data retaining portion 43a and each slave-side data retaining portion 53a. The detailed processes are as follows. The data exchange section 60 transmits the logical channel data, which is sent from the master-side data retaining portion 43a or each slave-side data retaining portion 53a, to the corresponding master-side data retaining portion 43a or the slave-side data retaining portion 53a.

<2-2. Processing Operation>

Next, a sequence of processing operations in an uplink process of the above-mentioned mobile communication test apparatus will be described. Here, a description will be given of a processing operation example in a case where the uplink process for the physical channel data which is input from the CC is executed in accordance with the preset scenario.

First, in the master communication processing section 40, the input physical channel data is converted into the transport channel data by the master-side PHY processing portion 44, the transport channel data is processed by the master-side HARQ processing portion 43d, and thereafter is output to the master-side conversion processing portion 43c. Further, in the master-side conversion processing portion 43c, the MAC header of the transport channel data, which is sent from the master-side HARQ processing portion 43d, is analyzed, and the division process is performed thereon such that it is changed into the logical channel data (DTCH data, DCCH data, CCCH data), thereby giving the output thereof to the master-side data retaining portion 43a.

In the master-side data retaining portion 43a, the logical channel data, which is sent from the master-side conversion processing portion 43c, is temporarily stored. Then, cross-checking is performed between the property information of the input logical channel data and the distribution information which is sent from the scenario processing section 20, and the retained logical channel data is sent to the corresponding slave-side data retaining portion 53a through the data exchange section 60 when the retained logical channel data is data which is not self-addressed. Further, when the retained logical channel data is data which is self-addressed on the basis of the distribution information, the retained logical channel data is output to the master-side RLC processing portion 42 as it is.

The master-side RLC processing portion 42 performs the ARQ process and the segmentation and concatenation process on the logical channel data (DTCH data, DCCH data), which is sent from the master-side data retaining portion 43a, for each logical channel, gives an output thereof to the master-side PDCP processing portion 41, and outputs the control data (CCCH data), which is sent from the master-side data retaining portion 43a, to the scenario processing section 20 as the protocol message of the RRC sublayer of the layer 3. Then, in the master-side PDCP processing portion 41, the deciphering process and the decompression process based on ROHC or the deciphering process and the integrity verification process are performed on the logical channel data (DTCH data) and the control data (DCCH data) sent from the master-side RLC processing portion 42, the processed DTCH data is output as the IP data to the user data processing section 70, and the processed DCCH data is output as the protocol message of the RRC sublayer of the layer 3 to the scenario processing section 20.

Meanwhile, in a similar manner to the slave communication processing section 50, the input physical channel data (RF signal) is converted into the transport channel data by the slave-side PHY processing portion 54, and the transport channel data is processed by the slave-side HARQ processing portion 53c, and is thereafter output to the slave-side conversion processing portion 53b. Further, in the slave-side conversion processing portion 53b, the MAC header of the transport channel data, which is sent from the slave-side HARQ processing portion 53c, is analyzed, and the division process is performed thereon such that it is changed into the logical channel data (DTCH data, DCCH data, CCCH data), thereby giving the output thereof to the slave-side data retaining portion 53a.

In the slave-side data retaining portion 53a, the logical channel data, which is sent from the slave-side conversion processing portion 53b, is temporarily stored. Then, cross-checking is performed between the property information of the input logical channel data and the distribution information which is sent from the scenario processing section 20, and the retained logical channel data is sent to the master-side data retaining portion 43a or the corresponding slave-side data retaining portion 53a through the data exchange section 60 when the retained logical channel data is data which is not self-addressed. Further, when the retained logical channel data is data which is self-addressed on the basis of the distribution information, the retained logical channel data is output to the slave-side RLC processing portion 52 as it is.

The slave-side RLC processing portion 52 performs the ARQ process and the segmentation and concatenation process on the logical channel data (DTCH data), which is sent from the slave-side data retaining portion 53a, for each logical channel, gives an output thereof to the slave-side PDCP processing portion 51, executes the deciphering process and the decompression process based on ROHC of the logical channel data (DTCH data) in the slave-side PDCP processing portions 51, and outputs the processed DTCH data as the IP data to the user data processing section 70.

Then, the data analysis process corresponding to test contents, such as the process of comparing data and the process of detecting the error rate of the IP data obtained from the master communication processing section 40 and the slave communication processing sections 50, and the data output process for the connected external apparatus are terminated.

As described above, the above-mentioned mobile communication test apparatus 1 has the following configuration for performing the downlink process. In the configuration, the logical channel data to be transmitted to the mobile communication apparatus in accordance with the preset distribution information is processed to be distributed to a plurality of master communication processing sections 40 and slave communication processing sections 50 on a logical channel number basis. In each of the communication processing sections 40 and 50, in the logical channel data which is temporarily retained, the logical channel data, which is not self-addressed, is sent to the corresponding master communication processing section 40 or the corresponding slave communication processing sections 50, through the data exchange section 60.

Further, the configuration for performing the uplink process is as follows. Each of the communication processing sections 40 and 50 sends the logical channel data, which is not self-addressed, in the logical channel data, which is distributed in accordance with the preset distribution information, to the corresponding master communication processing section 40 or the corresponding slave communication processing sections 50 through the data exchange section 60.

Thereby, it is possible to provide, with low costs, the mobile communication test apparatus capable of performing various operation tests for the downlink process and the uplink process of the LTE-A mobile communication apparatus or the like which performs wireless communication by bundling a predetermined number of frequency blocks.

Meanwhile, the system configuration for the downlink process and the uplink process according to the embodiment mentioned above is a configuration in which the logical channel data is distributed on the basis of the distribution information sent from the scenario processing section 20. However, the invention is not limited to this, the following configuration may be adopted: for example, the distribution tables corresponding to the test items are stored in advance, or are separately stored as the preset fixed distribution information in the logical channel distribution section, the MAC processing portion, and the like, and the distribution process is performed on the logical channel data which is read at the time of the downlink process and the uplink process.

Further, the present embodiment described the configuration in which the communication processing section having the scheduler 43b functions as the master communication processing section 40 and a plurality of communication processing sections other than that are employed as the slave communication processing sections 50, but the invention is not limited to this. In this apparatus, it is preferable that at least each of the communication processing sections 40 and 50 perform the scheduling processing of the retained logical channel data. Hence, for example, it may be possible to adopt a configuration in which the scheduler 43b is independently provided in the apparatus or is mounted on the data exchange section 60.

Furthermore, as shown in FIGS. 1 and 3, the present embodiment describes an example in which signals are input/output between the mobile communication apparatus as the test target and the single CC of each of the master communication processing section 40 and the plurality of slave communication processing sections 50, but the number of CCs is not limited to this. For example, there may be provided the master-side conversion processing portion 43c, the master-side HARQ processing portion 43d, and the master-side PHY processing portion 44 in the master communication processing section 40 and the slave-side conversion processing portion 53b, the slave-side HARQ processing portion 53c, and the slave-side PHY processing portion 54 in the slave communication processing section so as to respectively correspond to the plurality of CCs. With such a configuration, it is possible to perform the operation test between the mobile communication apparatus and the plurality of CCs.

Further, the above-mentioned embodiment described the test apparatus as the base station simulation apparatus for testing the mobile communication terminal. However, the present invention may be applied to the mobile communication terminal simulation apparatus for testing the base station.

DESCRIPTION OF REFERENCE NUMERALS AND SIGNS

1: MOBILE COMMUNICATION TEST APPARATUS
10: TFT PROCESSING SECTION
20: SCENARIO PROCESSING SECTION
21: SCENARIO STORAGE MEANS
30: LOGICAL CHANNEL DISTRIBUTION SECTION
40: MASTER COMMUNICATION PROCESSING SECTION
41: MASTER-SIDE PDCP PROCESSING PORTION
42: MASTER-SIDE RLC PROCESSING PORTION
43: MASTER-SIDE MAC PROCESSING PORTION (43a: MASTER-SIDE DATA RETAINING PORTION, 43b: SCHEDULER, 43c: MASTER-SIDE CONVERSION PROCESSING PORTION, 43d: MASTER-SIDE HARQ PROCESSING PORTION)
44: MASTER-SIDE PHY PROCESSING PORTION
50: SLAVE COMMUNICATION PROCESSING SECTION
51: SLAVE-SIDE PDCP PROCESSING PORTION
52: SLAVE-SIDE RLC PROCESSING PORTION
53: SLAVE-SIDE MAC PROCESSING PORTION (53a: SLAVE-SIDE DATA RETAINING PORTION, 53b: SLAVE-SIDE CONVERSION PROCESSING PORTION, 53c: SLAVE-SIDE HARQ PROCESSING PORTION)
54: SLAVE-SIDE PHY PROCESSING PORTION
60: DATA EXCHANGE SECTION
70: USER DATA PROCESSING SECTION

The invention claimed is:
1. A mobile communication test apparatus that simulates an operation of a counter device which communicates as a counterparty with an LTE-A (Long Term Evolution Advanced) mobile communication apparatus performing wireless communication by bundling a plurality of frequency blocks, the mobile communication test apparatus comprising:
a logical channel distribution section that performs a distribution process on logical channel data to be transmitted to the mobile communication apparatus, on a logical channel number basis, in accordance with preset distribution information;
a plurality of communication processing sections each of which is provided to correspond to each of the plurality of frequency blocks and receives the logical channel data which is distributed by the logical channel distribution section; and
a data exchange section that transmits the logical channel data from each communication processing section to the communication processing section which is to function as a transmission source of the corresponding data for the mobile communication apparatus,
wherein each communication processing section is provided with a MAC processing portion having a data retaining portion which temporarily retains the logical channel data distributed by the logical channel distribution section, if the logical channel data is addressed to the communication processing section itself, converts the logical channel data into transport channel data, otherwise sends the logical channel data to the data exchange section, and wherein the mobile communication test apparatus is configured to perform an operation test of the LTE-A mobile communication apparatus.

2. The mobile communication test apparatus according to claim 1, further comprising a scheduler that performs scheduling for allocating the communication processing section to function as the transmission source of the corresponding logical channel data, on the basis of property information of each logical channel data which is output from each communication processing section, and outputs a scheduling result thereof as scheduling result information to each communication processing section, wherein the communication processing section sends the logical channel data, which is not self-addressed, in the retained logical channel data to the corresponding communication processing section through the data exchange section, on the basis of the scheduling result information from the scheduler.

3. The mobile communication test apparatus according to claim 1, wherein the logical channel distribution section performs the distribution process in accordance with distribution information described in a scenario in which messages are chronologically described in a sequence of an operation test of the mobile communication apparatus.

4. A mobile communication test apparatus that simulates an operation of a counter device which communicates as a counterparty with an LTE-A (Long Term Evolution Advanced) mobile communication apparatus performing wireless communication by bundling a plurality of frequency blocks, the mobile communication test apparatus comprising:

a plurality of communication processing sections each of which is provided to correspond to each of the plurality of frequency blocks, is provided with a MAC processing portion having a data retaining portion which temporarily retains the logical channel data divided by analyzing a MAC header of transport channel data into which a signal of a predetermined number of the frequency block transmitted from the mobile communication apparatus is converted, processes the logical channel data, which is self-addressed, on a logical channel basis, and sends the logical channel data, which is not self-addressed, to the outside; and a data exchange section that receives the logical channel data, which is sent to the outside by each communication processing section, and transmits the corresponding logical channel data to the communication processing section as a transmission destination, wherein the mobile communication test apparatus is configured to perform an operation test of the LTE-A mobile communication apparatus.

5. The mobile communication test apparatus according to claim 4, wherein the MAC processing portion performs a distribution process of distributing the logical channel data to the logical channel data, which is self-addressed, and the logical channel data, which is not self-addressed, in accordance with distribution information described in a scenario in which messages are chronologically described in a sequence of an operation test of the mobile communication apparatus.

6. A mobile communication test method that uses a mobile communication test apparatus including a plurality of communication processing sections, each of which is provided to correspond to each of the plurality of frequency blocks in order to communicate with an LTE-A (Long Term Evolution Advanced) mobile communication apparatus by bundling a plurality of frequency blocks, and a data exchange section, which performs a relay process of data exchanged between the communication processing sections, and that simulates an operation of a counter device which communicates as a counterparty with the mobile communication apparatus, the mobile communication test method comprising steps of:

distributing logical channel data, to be transmitted to the mobile communication apparatus, to each communication processing section in accordance with preset distribution information;

sending the logical channel data, which is not addressed to the corresponding communication processing section, in the logical channel data, which is distributed to the communication processing section, to the communication processing section to function as a transmission source of the corresponding data, through the data exchange section;

converting the logical channel data, which is received through the data exchange section, and the logical channel data, which is distributed to be addressed to the corresponding communication processing section, in the logical channel data, which is distributed to the communication processing sections, into transport channel data; and performing an operation test of the LTE-A mobile communication apparatus.

7. The mobile communication test method according to claim 6, further comprising steps of:

performing scheduling for allocating the communication processing section to function as the transmission source of the corresponding logical channel data, on the basis of property information of each logical channel data which is output from each communication processing section;

outputting a scheduling result of the scheduling as scheduling result information to each communication processing section; and sending the logical channel data, which is not self-addressed, in the logical channel data, which is retained by the communication processing section, to the corresponding communication processing section through the data exchange section, on the basis of the scheduling result information.

8. The mobile communication test method according to claim 6, wherein in the step of distributing, distribution is performed in accordance with distribution information described in a scenario in which messages are chronologically described in a sequence of an operation test of the mobile communication apparatus.

9. A mobile communication test method that uses a mobile communication test apparatus including a plurality of communication processing sections, each of which is provided to correspond to each of the plurality of frequency blocks in order to communicate with an LTE-A (Long Term Evolution Advanced) mobile communication apparatus by bundling a plurality of frequency blocks, and a data exchange section, which performs a relay process of data exchanged between the communication processing sections, and that simulates an operation of a counter device which communicates as a counterparty with the mobile communication apparatus, the mobile communication test method comprising steps of:

performing a division process such that a MAC header of transport channel data, into which a signal of a predetermined number of the frequency block transmitted from the mobile communication apparatus is converted, is analyzed to be logical channel data;

distributing the corresponding logical channel data to the communication processing section to process the logical channel data in accordance with preset distribution information;

sending the logical channel data, which is not addressed to the corresponding communication processing section, in the logical channel data, which is distributed to the communication processing section, to the communication processing section to function as a transmission destination of the corresponding data, through the data exchange section; and processing the logical channel data, which is received through the data exchange section, and the logical channel data, which is distributed to be addressed to the corresponding communication processing section, in the logical channel data, which is distributed to the communication processing sections, on a logical channel basis; and performing an operation test of the LTE-A mobile communication apparatus.

10. The mobile communication test method according to claim 9, wherein in the step of distributing, the logical channel data is distributed in accordance with distribution information described in a scenario in which messages are chronologically described in a sequence of an operation test of the mobile communication apparatus.

* * * * *